March 5, 1929.  L. MATISKA  1,704,621
BARBECUING MACHINE
Filed Feb. 3, 1928
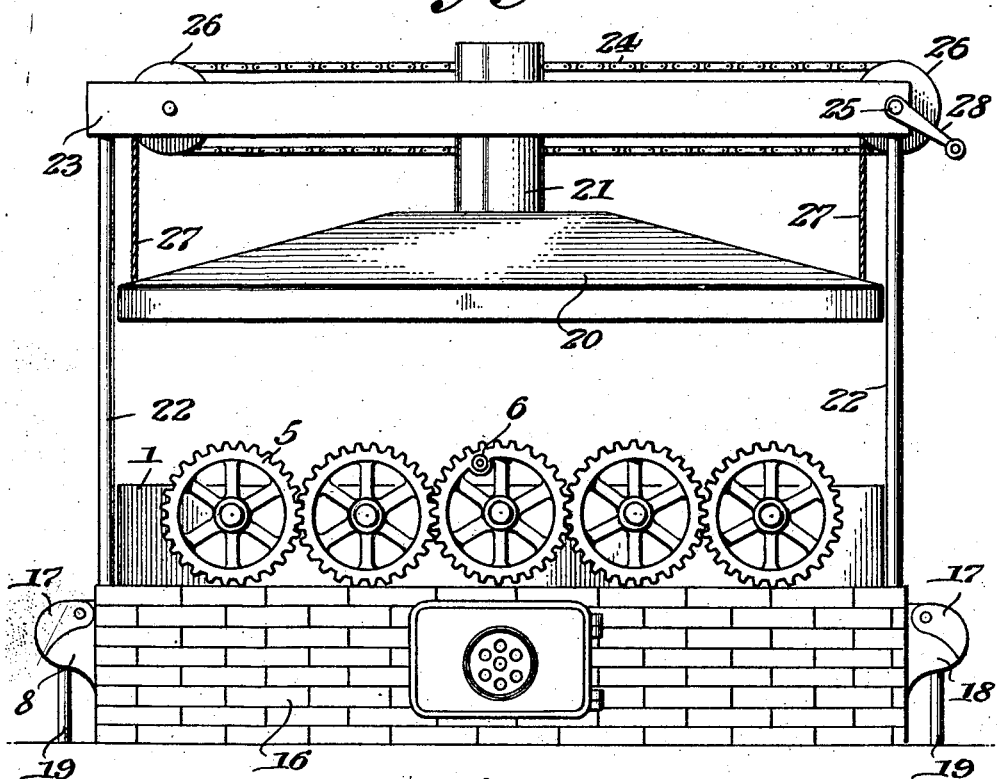
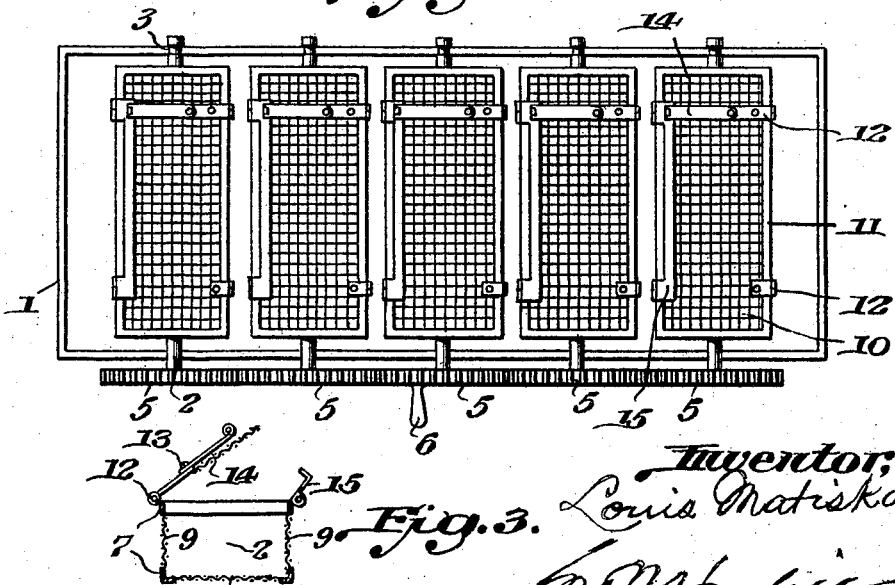

Patented Mar. 5, 1929.

1,704,621

UNITED STATES PATENT OFFICE.

LOUIS MATISKA, OF EVANSVILLE, INDIANA.

BARBECUING MACHINE.

Application filed February 3, 1928. Serial No. 251,642.

The object of my invention is to provide an improved machine which will be adapted to hold all of the pieces of meat being barbecued and by which all of them may be simultaneously turned so that both sides of the meats will be subject to the heat and also the edges thereof, thus insuring equal heat-treatment of all of the meats and the subjecting of both sides and edges to the heat, resulting in superior treatment and doing away with the necessity of employing a skilled person to handle meats in a barbecuing operation.

The machine also contemplates the provision of means for taking off the smoke and gases resulting from the barbecuing operation.

The invention contemplates the provision of a plurality of meat holders, each of improved construction, and each journalled or swiveled so that it may be completely turned over or arranged in an intermediate position, together with means for simultaneously operating all of the meat holders.

The invention also contemplates an improved adjustable smoke bell and mounting therefor adapted for use in connection with the machine.

The respective meat holders are of novel construction and are interchangeable.

In the accompanying drawings:

Figure 1, is a front elevation showing the complete machine in use, mounted on a heater or oven;

Fig. 2, is a plan view of the meat holders and their supporting frame; and

Fig. 3, is a section through one of the meat holders, the door or cover of which is shown as partly open.

The meat holders are carried by a metal frame 1 which, as shown, is of rectangular shape. There may be as many meat holders as desired, each one of which is of the same construction as the others, rendering them interchangeable.

Each meat holder has a shaft 2 which is provided with journals 3 and 4 mounted in suitable bearings in the frame 1 in such manner that each meat holder may be bodily removed from the frame 1 when desired, without disturbing the remaining meat holders. Each shaft 2 has a gear 5; the gears of the adjacent meat holders mesh with each other and one or more of them has a handle 6 by which the entire series of meat holders may be turned.

Each meat holder has metal frames 7 for the top and bottom thereof. The bottoms 8 of the meat holders and the sides and ends thereof, or at least the sides, are of wire netting of suitable mesh and gage to properly support the meats and withstand the heat; any suitable material may be used for this purpose. The shafts or axles 2 may simply be stub shafts connected to the ends of the meat holders, or, said shafts may run completely through the meat holders. The meat holders have covers or tops 10 of wire netting, suitably edged by a frame 11 which is connected by hinges 12 to the frame 7. To one or more of the hinges there is pivoted at 13 a latch 14. Hinged to the frame 7 is an elongated latch bar 15 which is adapted to fold over the free edge of the cover, as shown in Fig. 2 and to be overlapped by the free end of the latch 14. This arrangement keeps the cover 10 tightly closed and yet permits it to be quickly opened.

The journals 3 are of reduced size or provided with collars to engage their bearings in the frame 1 so that the meat holders can not move lengthwise of themselves.

As described, the machine is complete and self-contained inasmuch as it may be set over a fire or oven. Meats having been placed in the meat holders and the covers secured, after one side of each piece of meat has been barbecued to the proper extent, the handle 6 may be given a quarter turn in either direction so that the edges of the pieces of meats may be subject to the heat. Another quarter turn of the handle 6 will present the other side of each piece of meat to the fire and when such sides have been barbecued, another quarter turn of the handle will bring those edges of the meat which were previously uppermost, into a lowermost position so that they may be barbecued.

Thus, an unskilled operator can simultaneously turn all of the pieces of meat so that both sides and both edges of each piece will be suitably treated by the heat.

The meat holders being of the same size and construction, they may be interchanged or any one of them removed and another substituted if repairs become necessary. As all of the meat holders are intergeared so that they lie in corresponding positions, substantially all of the meats held by the different holders become barbecued to substantially the same extent, tending to bring about uniformity of treatment with corresponding saving of time and improvement of product.

In using the machine, it may be set over any oven or fire but I prefer to mount it on the brick work 16 of an oven or heater which may be fired either by coal or gas. As shown, the oven is provided with hinged lids 17 at its ends which serve as covers for metallic boxes 18 to which lead gas supply pipes 19 which deliver the gas to suitable burners, not shown, extending underneath the meat holders and carried by the brick work 16. The hinged lids 17 enable the burners to be lighted, or turned off at either or both ends of the brick work.

I also prefer to provide an adjustable smoke bell 20 which has a flue or stack 21 and is located above the meat holders, said bell preferably being of rectangular shape and provided with the means shown for raising and lowering it. The pipe or flue 21 may discharge into the open air, or be connected to a chimney, according to the location of the machine. As shown in Fig. 1, there are uprights 22 which support a frame 23 having sprocket wheels connected by a sprocket chain 24 and carried on the same shafts 25 which have sheaves 26 on which wind ropes or cables 27 which suspend the bell 20. One of the shafts 25 is provided with a handle 28. By turning the handle 28, the sheaves 26 will take up or let out the cables 27, thereby to raise or lower the bell 20. The bell 20 catches the smoke, gases, and odors arising from the fire and meats and conveys them away.

What I claim is:

In a barbecuing machine, a meat holder having a body of box-like form comprising a rigid bottom, sides, and ends of open-work construction, and a top of open-work construction which is hinged and serves as a cover, a hinged elongated latch bar extending lengthwise of, and attached to the cover, and a pivoted latch adapted to co-operate with said latch bar, and means whereby the meat holder may be mounted for turning.

In testimony whereof I affix my signature.

LOUIS MATISKA.